Sept. 23, 1924.　　　　　　　　　　　　　　　　1,509,806
O. FOURNIER
PHOTOPRINTING MACHINE
Filed March 29, 1922　　6 Sheets-Sheet 6

Inventor:
Oscar Fournier
By Wood & Wood
Attorneys

Patented Sept. 23, 1924.

1,509,806

UNITED STATES PATENT OFFICE.

OSCAR FOURNIER, OF SYMMES TOWNSHIP, HAMILTON COUNTY, OHIO, ASSIGNOR TO THE UNITED STATES PLAYING CARD COMPANY, OF NORWOOD, OHIO, A CORPORATION OF OHIO.

PHOTOPRINTING MACHINE.

Application filed March 29, 1922. Serial No. 547,840.

*To all whom it may concern:*

Be it known that I, OSCAR FOURNIER, a citizen of the United States, and residing at Symmes Township, in the county of Hamilton and State of Ohio, have invented a new and useful Improvement in Photoprinting Machines, of which the following specification is a full disclosure.

This invention relates generally to the photographic art and particularly to an apparatus for photographically printing upon a sensitized metal plate, the said plate being subsequently etched for ink printing. The apparatus provides a plate carrier for holding and exposing a developed photographic plate, as a negative universally adjustable about an axis, for negative centering, in right angle directions, to printing position, for making a plurality of separate or duplicating printing exposures at different and accurately determined locations upon a sensitized sheet; and a combined negative plate centering or squaring and sensitized sheet holding frame, mounted in relation to the negative plate or its carrier for negative plate centering and photographic printing operations.

The capacity of the apparatus is very extended, being adapted for printing upon small or large sheet sizes, in the preparation of ink printing sheets or plates, either for single or multi-color printing. The apparatus may be used for printing upon metal sheets or plates for multi-color printing, in which each sheet may contain or provide only a single image with only one negative plate exposure, a different negative and printing sheet being used for each printing exposure, the method of the centering and squaring of the different negatives being the same in both cases.

A second use is for preparing an ink printing sheet for single color printing, the sheet being sub-divided into a plurality of image or impression divisions or areas relatively positioned and spaced, with the various images as duplicates.

A third use has the character of the second, but is for preparing impression sheets for multi-color ink printing, for which the negative or negatives employed require the most accurate micrometric centering and setting to produce ink printing sheets or plates for the highest quality of multi-color printing. This class of printing is best exemplified in the preparation of ink printing sheets or plates for printing art backs of playing cards, in which the impression sheet for each color contains card size impression spaces or sub-division, of duplicate image representation for the entire set of cards of a pack or deck. It is to this class of work which is most delicate, and which requires the highest art to accomplish, that the apparatus of the present invention is directed, as well as to the production of ink impression plates for such class of work, which production is accomplished efficiently, economically, and with accuracy and precision in a very simple manner.

As a preliminary to the color printing process, negatives are prepared, one for each color, and the image of each negative is transferred by photographic process to its respective metal printing-plate. In some instances it is desirable to place a plurality of duplicate images upon each plate and to space the same relative to one another in a predetermined manner. In making a plurality of duplicate printing plates, one for each color, the accurate positional duplication of the respective color images has presented great difficulty, which it is an object of this invention to overcome.

It is of vital importance that the images of any given plate be in accurate positional correspondence with the corresponding images of every other plate of a series of printing plates, in order that in the printing operation, the colors successively transferred by the respective plates to the sheet being printed will exactly coincide with the previously transferred colors and images, to give clean color and image definition.

In order to photographically transfer the respective color plates in such manner that all of the images will subsequently be in positional correspondence in or for the printing operation, the negative for each color is identically edge-marked at the time of making to provide means for the preliminary centering of each negative with respect to its sensitized plate before beginning the photographic transferal of its image in plurality to that plate.

The machine hereinafter fully described, is designed to center photographic negatives in respect to sensitized metal plates and to photographically transfer the images to said plates, as well as to transfer the images in plurality to a single plate, and to make accurate duplicates of said plate as regards the image outlines and their positional relation thereon.

Objects and advantages will be discussed in the description of the drawings, forming a part of this specification, and reference is made to said accompanying drawings in which.

Figure 7:
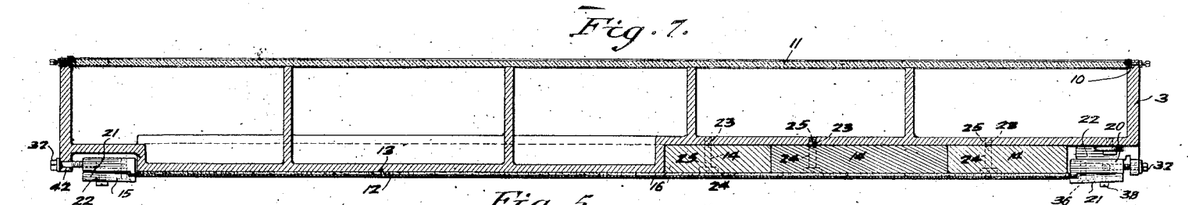
Figure 7 is a section on line 7, 7, of Fig. 6.
Figure 8:
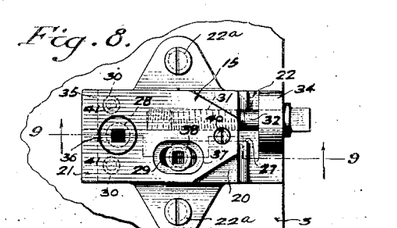
Figure 8 is a detail plan view of one of the clamps for stretching and holding the metal plate upon the tumbler.
Figure 9:
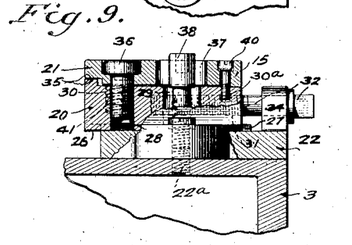
Figure 9 is a section on line 9, 9, of Fig. 8.
Figure 10:
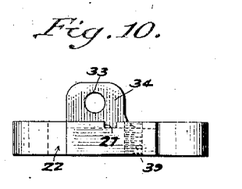
Figure 10 is an end view of the attachment block.
Figure 11:
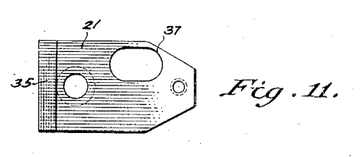
Figure 11 is a reverse plan of the upper clamp plate.
Figure 12:
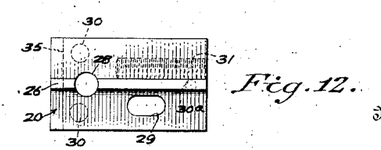
Figure 12 is a reverse plan of the lower clamp plate.
Figure 13:
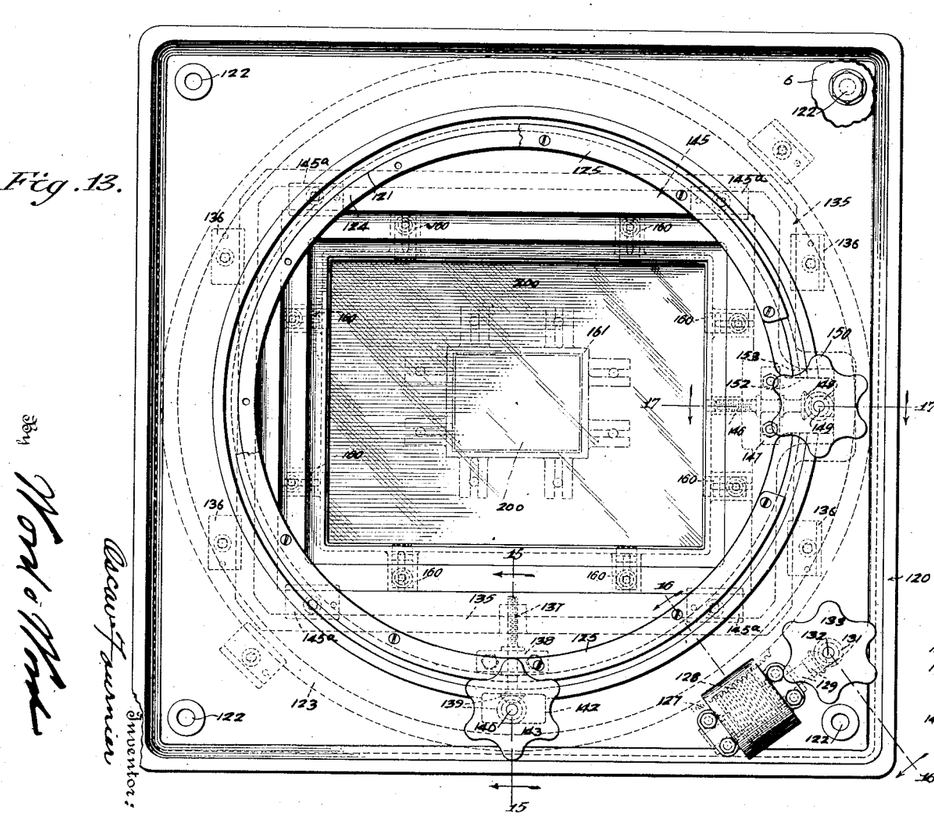
Figure 13 is a rear face of the adjustable negative plate carrier.

The machine comprises a base frame 1, at one end of which is immovably attached a frame 2, supporting a rotatable tumbler 3, the construction and operation of which is hereinafter fully described. A frame 4, movable toward and away from the tumbler 3, is mounted upon guides of the frame 1, and provides, a vertically movable horizontal carrier beam 5, having suitable ways upon which rests a horizontally movable negative plate carrier frame 6, having the adjustable negative plate carrier 7 attached thereto. Said frame 6 also supports the light chamber 8, movable relatively to the frame 6 and toward and away from the plate carrier 7, and this chamber, during a negative centering operation, is bodily removed from the frame 6, by a suitable lifting device, such as an over-head traveler, the cable of which can be attached to the eye 9. The tumbler 3, which forms a most important feature of this invention, is of hollow rectangular box-like structure, open at one side and provides a peripheral groove 10 into which is fitted and suitably held a ground-glass plate 11, having diametric cross lines $a$ thereon. The interior of the tumbler is provided with lighting means, designated at 11[a] for use in the negative centering operation. The closed side of the tumbler provides a platen surface 13 exactly parallel with the outer surface ground-glass plate 11, and this surface may be enlarged or extended by the use of filler elements 14, (Figs. 6 and 7), in the form of L-shaped blocks which increase its area, conformably to the requirement for different sized sensitized printing plates, which are stretched thereagainst, in the following manner, (see Figs. 6 and 7). A light sensitive sheet metal plate 12 is clamped and stretched against the surface 13 and co-linear surfaces of the elements 14, by means of clamps generally designated at 15, an elastic blanket 16 being interposed between the said surfaces and the back of said plate. The clamping elements 20 and 21, (see Figs. 8 to 12 inclusive) are used in cooperative pairs, as means for clamping and stretching the plates, and are identical in construction, but upon the right and lower side (Fig. 6) of the tumbler, adjustable attachment and slide blocks 22 are provided which are removably attached by screws 22[a] to the tumbler, and can be adjusted inwardly as required for smaller sized plates and held by screws engaging threaded openings 23. Screws 25 being passed through openings 24 in the elements 14, and into one of the openings 23 to hold said elements to said tumbler, the openings 23 thus serving a double function. The element 20 has a central rib 26, slidably engageable with a corresponding groove 27, in the block 22, and is provided with a transverse threaded bore 28, a transverse slot 29, two transverse spring sockets 30, a small screw threaded socket 30$^a$, and an elongated, longitudinal, threaded bore 31, receiving the threaded end of a collar-head screw 32, rotatable in the bore 33, of an upstanding ear or lug 34, of the block 22. By turning the screw 32, the clamping element as a whole is moved to stretch the plate clamped thereto. The plate 12 is held clamped between the outer edges 35 of the elements 20 and 21 by a headed clamping screw 36 loosely socketed in the element 21 and engaging the threads of bore 28. An additional headed clamping screw 38, traverses the slot 29, and has threaded engagement with a bore 39, its head bearing upon the upper surface of the element 20, and being housed by the slot 37 of the element 21, the slots 29 and 37 allowing lengthwise movement of the elements 20, 21, about the screw 38. The element 21 is pivotally held as at 40 to the element 20 and springs 41 are placed in the sockets 30, to force the clamping elements apart when released. Only the elements 20 and 21 are used at the top and left hand side of the tumbler, (see Fig. 6), and in this instance, the collar-head screws traverse openings in the flange 42.

The tumbler frame is provided with horizontal diametric co-axial trunnions 50, having rotative bearing in the side walls of the frame 2; and the said frame is provided with locking sockets 51, in its opposite parallel vertical side faces, which are engaged by spring-actuated slidingly mounted taper-pins 52, having slots 53 therein (see Figs. 2 and 18), the said pins being retractable through means of arms 54, engaged in said slots, and attached to vertical parallel shafts 55, suitably rotatably mounted upon the inner faces of the frame 2, and provided with bevelled gears 56, meshing with companion gears 57 upon a horizontal shaft 58, rotatable by a hand lever 59, at the side of the frame 2. The tumbler is rotatable through an arc of 180° to alternately position its respective faces in opposition with the negative carried by the plate-carrier 7, and to also bring either of its faces into perfect alignment with the faces 60 of the frame 2, in each of which positions the tumbler is rigidly locked. The tumbler rotation is accomplished by means of a large worm-gear 61, attached to one of the trunnions 50, outside of the frame 2, and meshing with a worm 62, carried by shaft 63 rotatable in bearings 64, by wheel 65, after release of taper-pins 52, by operation of hand-lever 59.

Figures 1, 6:
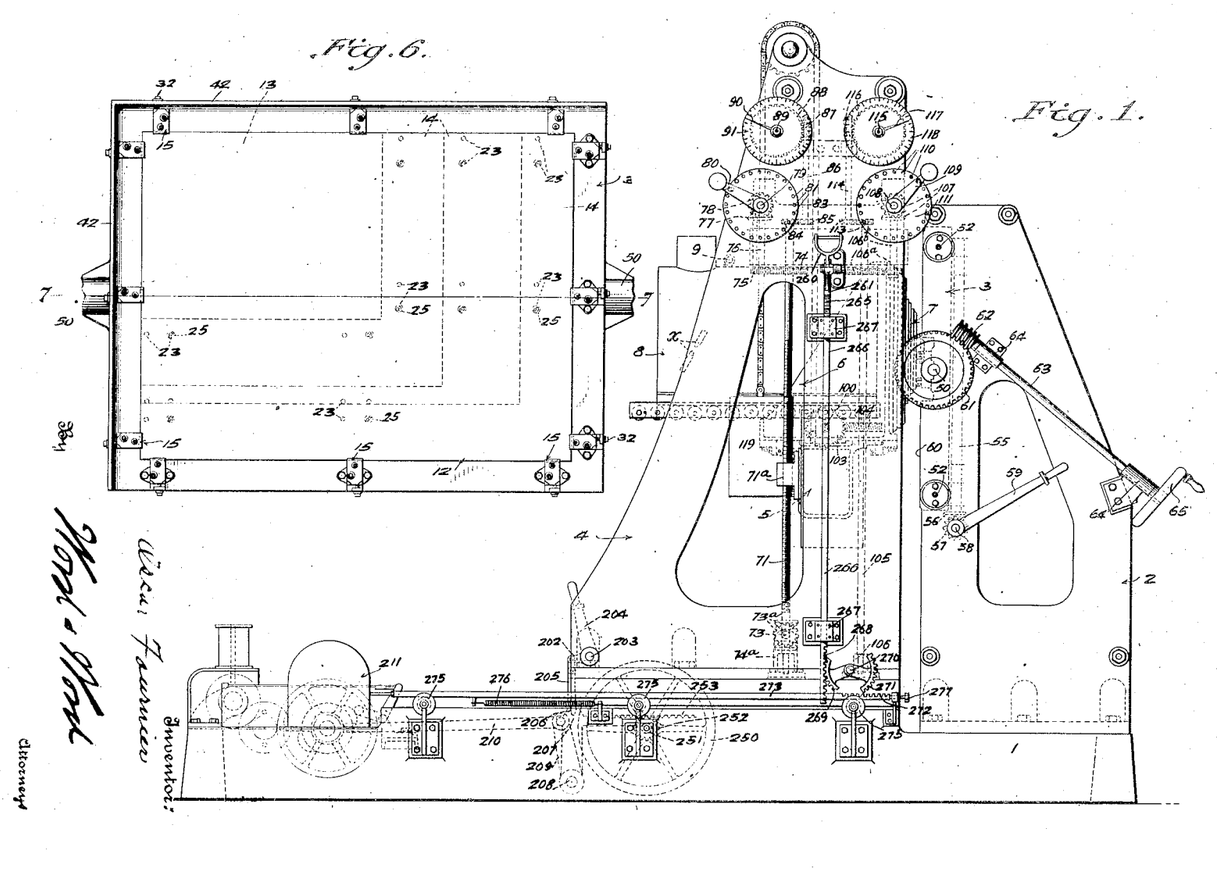
Figure 1 is a general side elevation of my improved apparatus.
Figure 6 is a view similar to Fig. 3, showing a large size sensitized metal plate in clamped and stretched position upon the tumbler.
Figures 2, 18:
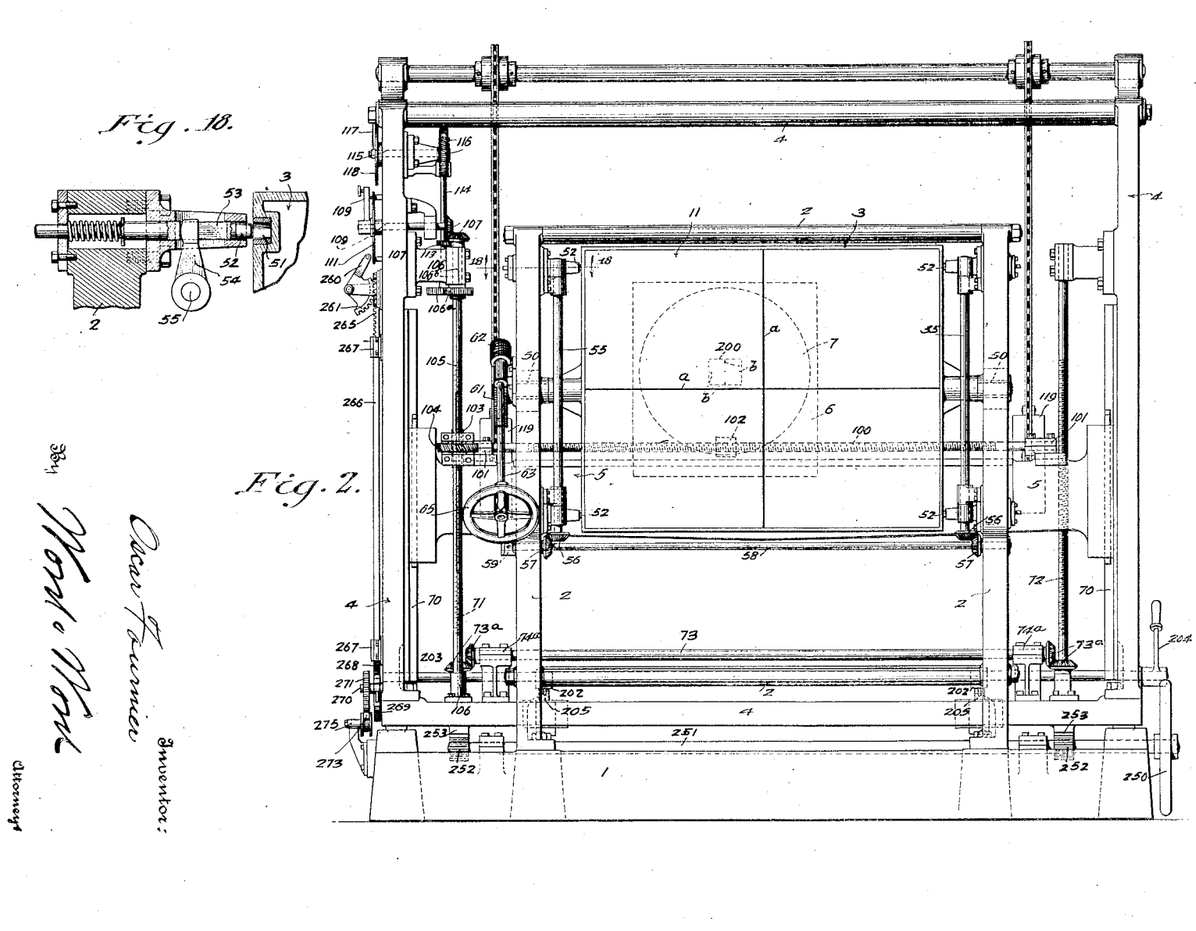
Figure 2 is an end view of the same.
Figure 18 is a detail section on line 18, 18, of Fig. 2, illustrating the structure of one of the tumbler locking-bolts.
Figures 3, 5:
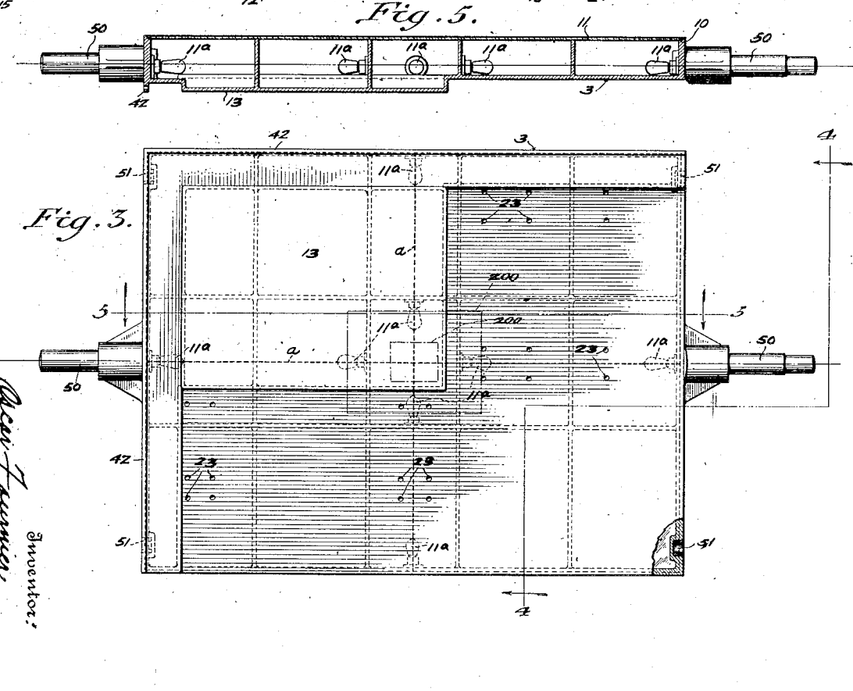
Figure 3 is a detail face view of the tumbler, viewed from the side to which the sensitized metal plate is attached.
Figure 5 is a section on line 5, 5, of Fig. 3.
Figure 4:
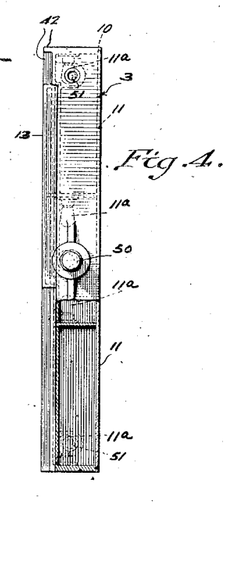
Figure 4 is a section on line 4, 4, of Fig. 3.

The movable frame 4, is translatable upon parallel side guides of the base 1, and is provided with opposed vertical guides 70 between which the beam 5 slides and is supported. The beam is vertically movable by means of vertical threaded shafts 71, 72, cooperating with the threaded nuts 71$^a$ on beam 5, the shafts having bevelled gear connection 73$^a$, at their lower ends with a connector shaft 73, rotatable in bearings 74$^a$, by which motion is transmitted from shaft 71 to shaft 72, both shafts traveling at equal speed. The shaft 71 is actuated by means of spur gears 74, 75, vertical shaft 76, bevel gears 77, 78, horizontal shaft 79, and crank handle 80, said handle having a spring-actuated pin, engageable with the openings 81 of stationary plate 83. The upper end of shaft 71 carries spur-gear 84, meshing with spur-gear 85 at the lower end of shaft 86, the upper end of which is provided with worm 87, meshing with worm 88, carried by a horizontal rotatable shaft 89, provided with pointer 90, traveling over graduated dial 91. The openings of the plate 83 are equidistantly spaced and the angular distance between centers corresponds to .001 inch linear travel of the beam 5. The interval between any two graduation marks of the dial 91 corresponds to one complete revolution of the handle 80, which is equivalent to .01 inch linear motion of the beam 5.

The extent of angular motion of the handle 80 is indicated upon the dial by the pointer 90, constituting a means for recording the exact position of the beam 5, whereby it may be accurately returned to that position at any subsequent time by a correspondingly setting of the dial pointer.

The negative plate carrier frame 6 is adapted to slide horizontally upon the beam 5 and is micrometrically adjustable thereacross in a manner similar to the adjustment of the beam 5. This adjustment is accomplished by means of a horizontal threaded shaft 100, held for rotation in suitable bearings 101, carried by beam 5 and coacting with a nut 102 attached beneath the frame 6. This shaft carries a spiral gear 103 meshing with a similar gear 104 splined upon a vertical shaft 105, rotative in bearings 106, said shaft being connected by spur gears 106$^a$, shaft 106$^b$, and bevelled gears 107, with handle shaft 108 having operating handle 109, similar to handle 80, having a spring and pin engageable with openings 110, of plate 111. Shaft 105 is connected with shaft 115, through spur-gears 113, shaft 114 and worm gears 116, a pointer 117 being provided to travel over a graduated dial plate 118, whenever the handle 109 is operated. The two handles and dials thus provide means for micrometrically moving the negative plate carrier frame 6, and negative plate carrier 7, attached thereto in directions at right angles to one another. Counterweights for the beam 5 are provided at 119. The light chamber 8 is of hollow cylindrical configuration and is supported for lengthwise motion upon rollers attached to the frame 6, from which it may be bodily moved when desired. Lighting means *x* is provided within said light chamber and may have electrical connections with any power source, and be automatically controlled.

Figure 14:
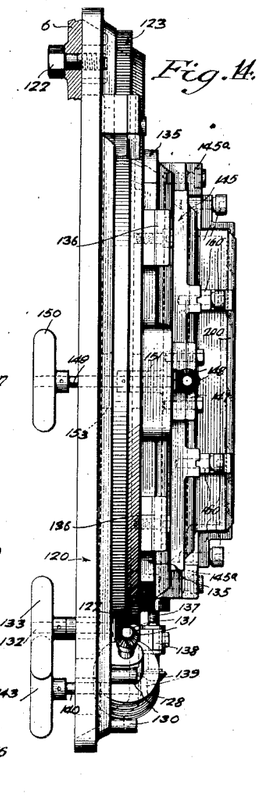
Figure 14 is an edge view of the same.
Figure 15:
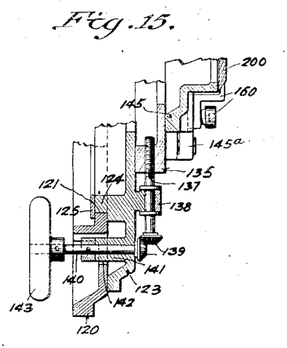
Figure 15 is a detail section on line 15, 15, of Fig. 13, showing means for vertical adjustment.
Figure 16:
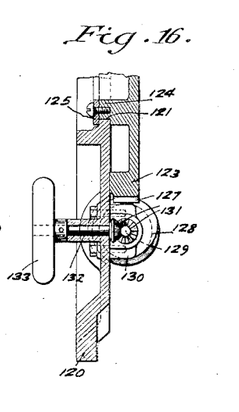
Figure 16 is a section on line 16, 16, of Fig. 13, showing the means for rotative adjustment.
Figure 17:
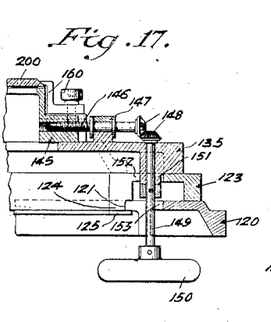
Figure 17 is a section on line 17, 17, of Fig. 13, showing the means for horizontal adjustment.

The negative carrier 7, (see Figs. 13, 14, 15, 16, 17), comprises a base frame 120, having a circular light opening 121, therethrough, the frame being suitably bolted to the carrier frame 6 as at 122. Upon the frame 120 is mounted for circular motion an open frame 123, (Figs. 14 and 16), providing a circular flange 124 frictionally and rotatably engaged within the opening 121, and held therein by a retainer ring 125 attached to said flange and overlapping said opening. The outer periphery is provided with gear teeth 127 meshing with wormgear 128, held upon shaft 129, said shaft being rotatably mounted in bearings 130, of the frame 120, and having bevelled gear connections as at 131, with a shaft 132, traversing frame 120 and provided with a handwheel 133 accessible from the inner side of said frame. Rotative movement can thus be given to frame 123. Upon the frame 123, (see Figs. 14 and 15), is slidingly mounted within and held by guides 136, a second open frame 135, capable of being micrometrically adjusted in vertical direction, and set, by means of screw shaft 137 held for rotative motion only by bearing 138, of frame 123, the threads of which engage corresponding threads to the frame 135. The shaft 137 is rotated through gears 139 by shaft 140, mounted in a bearing 141 of frame 123, which bearing traverses an opening 142 of frame 120, the shaft having a hand wheel 143, accessible like the wheel 133 at inner side of frame 120. The opening 142 is of sufficient length to allow a limited rotative movement of frame 123, about the bearing 141.

A third open negative carrying frame 145, (see Figs. 14 and 17), is slidably mounted in guides 145ª, upon the frame 135, and is also capable of micrometric adjustment, at right angles to said frame 135 by means of screw shaft 146, rotatively held in bearing 147 of frame 135, said shaft being connected by bevelled gears 148, with shaft 149, having a wheel 150, held in bearing 151, said bearing traversing elongated openings or notches 152 and 153 respectively of frames 123 and 120, allowing movement of said bearing and shaft 149, relative to said frames. As shown, the hand wheels 133, 143 and 150 are all accessible from the rear of the carrier frame and each of the three frames may be independently and micrometrically adjusted, in a negative centering operation.

The frame 145 is provided with screw actuated clamps 160, designed to clamp the negative plate 200 in position thereon. As shown in dot-and-dash lines, in Fig. 13, a frame 161, having an opening therein for a smaller negative, will be substituted for the frame 145.

The frame 4 is manually translated rearwardly and returned to its initial position at each turning of the tumbler 3, but, when it is returned, for a photographic operation, it is brought to such a position as will place the negative, carried by the negative plate carrier, within about one quarter of an inch of the sensitized plate, in which position the frame is locked by pins 205, engaging notches 206 of levers 207 rigidly attached to a rock-shaft 208, disposed transversely of the frame 1, and provided with a lever 209, having connected thereto a link 210, the opposite end of which is so disposed as to be actuated by a suitable timing mechanism, generally indicated at 211 to move the frame 4 and negative thereon forwardly to cause the negative to firmly contact the sensitized surface of the plate, to remain so in contact during the exposure, and to return the frame to its initial position, this timed cycle being repeated for each exposure. The frame 4 may also be manually moved by means of the hand wheel 250 disposed at the outside of the base 1 upon a shaft 251, disposed crosswise of said frame, said shaft being provided with pinion 252, meshing with gear racks 253 attached at opposite sides of and beneath the frame 4. When the above cycles are to be automatically timed, a starting lever 260, pivoted to frame 4 is used, having a gear segment 261 meshing with the teeth 265 of slide rod 266, guided as at 267, and having a rack 268 at its lower end in turn meshing with a gear segment 269 attached to a stub-shaft 270, of the frame 4. A second segment 271, its teeth disposed in substantially diametric relation to said segment 269 and outwardly therefrom, is attached to said stub-shaft 270, and this segment engages teeth 272 of the control rod 273, slidingly supported upon grooved guide rollers 275 at the side of frame 1. This rod is connected with the timing mechanism 211, designed to initiate and cause, through the link 210, and connected lever, a forward movement of frame 4, a timed dwell at the limit of that forward movement, and a return of the frame, after the photographic operation, to its initial position. The rod 273 is retracted by a spring 276, to normally impinge an adjustable stop 277. When the segment 271 is out of engagement with the rack 272, the frame 4 can be independently and manually moved, after disengaging the pins 205, from slots 206, the said pins being attached by short links to arms 202 of shaft 203, said shaft being operable by means of handle lever 204.

Figure 19:
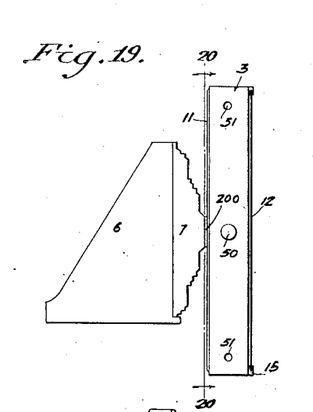
Figure 19 is a diagrammatic view showing the relative positions of the negative, to the tumbler and ground glass thereon during a centering operation.
Figure 20:
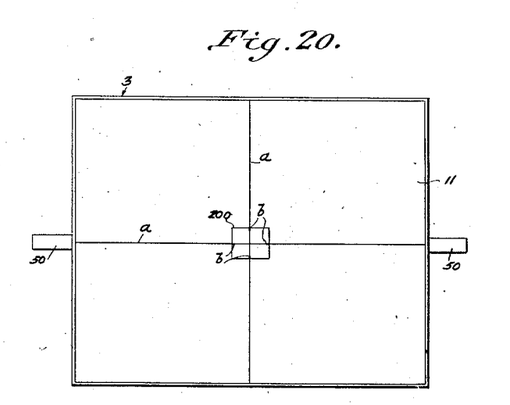
Figure 20 is a face view of the negative superposed upon and in centered coincidence with the cross-lines of the ground glass, taken on line 20, 20, of Fig. 19.

The general operation of centering a negative 200 in respect to the cross-lines of the tumbler ground-glass, or one side of the tumbler and to the sensitized metal printing plate, attached upon the opposite side of the tumbler tautly over platen surface thereof, and of photographically transferring images to said plate, is as follows:

The light chamber 8, having been bodily removed from the connection with the frame 6, the edge or gauge-marked negative 200, sustained within and adjustable by the negative plate carrier 7, is manipulated to bring the edge-marks $b$ into coincidence with the cross-lines $a$ of the ground-glass, the cross-lines being at that time illuminated from the interior of the tumbler, (see Figs. 19 and 20) providing a focusing vision through the light chamber of the negative plate carrying frame. This positions the negative plate and establishes a starting setting of the various gauge dials from which the various spacing setting adjustments are made or charted for laying off the impression division of the printing plate, as subdivision, each of the negative plate area. The frame 4 is then moved rearwardly sufficiently to allow for the rotation of the tumbler to bring the sensitized printing plate into position for contact by the negative. The light chamber is now replaced and adjusted. The frame 4 is then moved forwardly and locked as at 206, to the timing mechanism, bringing the surface of negative plate to within about one-quarter ($\frac{1}{4}$) of an inch of the surface of the sensitized plate. This setting of the plate carrier is for a minimum movement toward and from the sensitized plate for each printing exposure. It also provides for a unifrom plate contacting pressure for each exposure, which is also essential to uniform duplicate plate printing.

Figure 21:
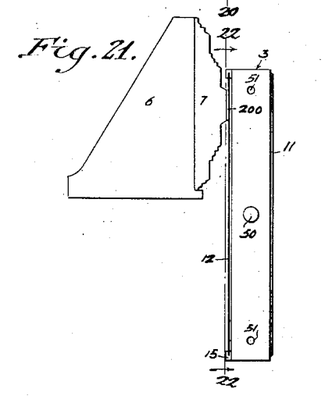
Figure 21 is a diagrammatic view showing the tumbler turned to bring the sensitized plate in juxtaposition to the negative for the photographic transferal of the image thereof to said plate.
Figure 22:
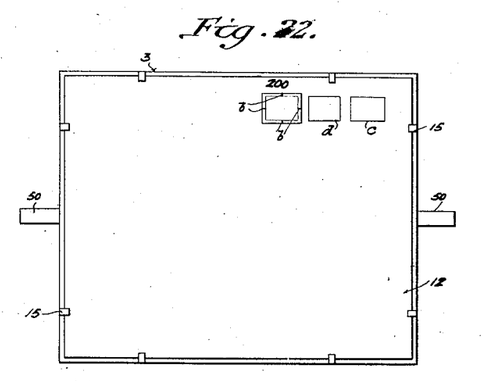
Fig. 22 is a face view of the sensitized plate on line 22, 22, of Fig. 21, showing a plurality of diagrammatic images thereon, and illustrating the operation of successively positioning and transferring duplicate photographic images thereto.
Figure 23:
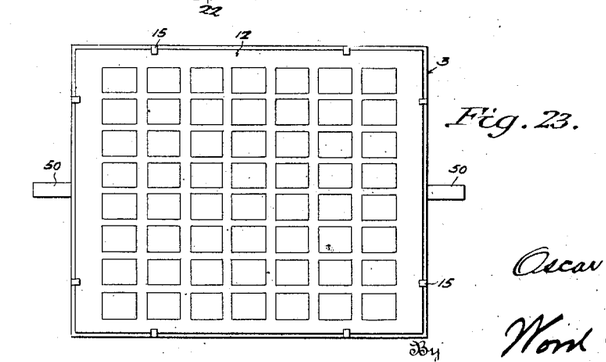
Fig. 23 is a diagrammatic face view of the sensitized plate representing a plurality of images photographed and positioned thereon.

By means of the handles 80, 109, moved conformably to known dial readings, the frame 6 is moved, in this instance, upwardly and to the right, (see Figs. 21 and 22) to position $c$, after which, the frame, with negative thereon is manually moved forwardly, or is so moved automatically by a timing mechanism, and in the latter case the said mechanism is started by the operation of the hand lever 260, to automatically move the negative forwardly not more than $\frac{1}{4}$ inch, to firmly contact the sensitized plate; to cause the exposure by light from a source $x$ within the light chamber 8; and to withdraw the negative after the exposure, to its initial position, preparatory to its adjustment to the required following position $d$, conformably to a predetermined dial reading. As above mentioned, this operation may be also manually performed. The photographic operation is repeated until the desired number of images or exposures have been made upon the printing plate, after which a second plate is substituted, and a second negative placed in the carrier, and the preliminary centering and photographing cycle is repeated, for the second plate as for the first. By reference to the previous dial reading and by means of levers 80 and 109 the positional duplication of images can be made, upon any number of printing plates so that the photographic color images of one plate will have accurate positional correspondence with the color images of each other plate as required in a printing operation.

The dial readings for each division setting or positioning of the negative plate are usually charted for purposes of reference when duplication is required as in printing on a second plate or for making repeat plates.

In the production of multi-color ink printing or impression plates for printing an entire pack of playing cards as heretofore referred to, the printing plates are necessarily of large dimension, to permit such printing of all of the cards of a pack or deck in one printing impression. This operation requires the card size impressions spaces or area divisions of the printing plate to be accurately and uniformly spaced relative to one another, either for single or multi-color work, for suitably printing a card stock sheet for slitting, cutting or dieing out the individual cards or divisions from the printed stock sheet. It will be recognized that if no systematic and accurate method of regularly placing or positioning the impression divisions or areas of each printing sheet or plate as regards image centering and squaring, and relative division positioning and spacing, that the cutting of the printed sheet into corresponding or equal dimension divisions with an image impression on each division centered with respect to the edges thereof would be a difficult if not an impossible task. For multi-color ink printing the requirements for accurate centering and image area spacing or positioning is considerably greater since it will be appreciated that if the impression of any one of the series of plates is out of center or position that no registration thereof can be made in printing nor will it be possible to make registry with the impressions of the subsequent color printing plates.

While the structural details of the negative plate holder mechanism for obtaining all of the necessary adjustments and settings, are disclosed and referred to in so far as is necessary for a complete understanding of the operation of the apparatus for either manual or automatic control, it is obvious that the same may be variously modified to present invention distinct and separate herefrom, their disclosure herein being only as elements forming a structural combination with the tumbler frame for purposes of correlation in producing certain operative results.

The apparatus combines in a single organization the negative plate centering or adjusting instrumentalities for obtaining results which heretofore have been obtained by the use of two separate apparatus, the use of which necessitated the removal of the plate carrier from the printing machine, for negative plate centering, the centering being accomplished through an incommodious method by which micrometrical accuracy could not be maintained because of the necessity for the transferal of the elements from one device or apparatus to another.

Having described my invention, I claim:

1. In a centering device, in combination with means for supporting a negative, a frame, supporting on its opposite faces in mutual parallelism, respectively a translucent plate and a sensitized plate, said frame being symmetrically rotatable for alternately opposing said plates to said negative, and means for positionally and contactually adjusting said negative relative to both plates.

2. In a centering device, the combination with a diametric edge-marked negative, of means for the micrometric adjustment of said negative universally in one plane, a centrally pivoted double faced frame, said faces respectively providing supports for a ground-glass, having right angularly related diametric cross lines thereon, and a photographically sensitized plate, means for rotating said frame for alternately opposing said ground-glass and said sensitized plate to said negative, and means for recording the positional relations of said negative with said glass and plate, said recording means being in fixed operable relation to the movements of said negative.

3. In a centering device, negative holding and adjusting means, having an index-marked negative attached thereto, a frame, supporting in mutually parallel relation, upon opposite sides thereof, respectively a translucent plate provided with cross-lines and a plane sensitized photographic plate, said frame being rotatable to bring the respective plates in opposition with said negative, and means for adjusting said negative-indexes for registration with said cross-lines, and for causing contact between said negative and either of said plates.

4. In a centering machine, negative plate holding and adjusting means, supporting a marked negative, a frame supporting upon opposite sides, respectively a translucent marked plate, and a sensitized plate means for rotating said frame for alternately bringing said plates in opposition to said negative, and means micrometrically adjustable, for the universal positional registration and contact of said negative with either of said plates.

5. In a centering device, the combination with an index-marked transparent plate, of supporting means for said plate, micrometrically and universally adjustable in one plane, a rotatable box-like frame, providing means on opposite sides for securing in mutual parallel relation, respectively a translucent plate having cross-lines thereon, and a sensitized plate, means for bringing said translucent and said sensitized plate alternately in opposition to said index-marked plate, and auxiliary means for the micrometric adjustment in two planes of said index-marked plate, for the registration of said index-marks with said cross-lines.

6. In a centering machine, micrometric negative holding and adjusting means, for supporting a marked negative, a frame, symmetrically rotatable, supporting upon opposite sides, respectively a translucent marked plate and a sensitized plate, means for rotating said frame for alternately bringing said plates in opposition to a marked negative, and means micrometrically adjustable for the universal positional registration and contact of said negative with either of said plates.

7. In a centering device, the combination with a transparent plate, having pairs of diametric edge-marks thereon at right angles to each other, of means for supporting, and for adjusting said plate micrometrically and universally in one plane, a symmetrically rotatable box-like frame, having lighting means therein, and providing means on opposite sides for securing, in mutual parallel relation, respectively a translucent plate having diametric cross-lines thereon at right angles to each other and a sensitized plate, means for alternately positioning and locking said plates in opposition to said transparent plate, and means for the micrometrical adjustment of said transparent plate, positionally, and contactually relative to said translucent and sensitized plates.

8. In a precision registering apparatus, a negative plate-carrying frame, means for the universal micrometric adjustment thereof, a hollow frame supported for symmetrical axial rotation, adjacent said plate-carrying frame, designed to support upon its opposite sides, in surface parallelism, respectively a translucent and a sensitized plate, means for rotating said frame for alternately opposing said plates to said plate-carrying frame, and means in geared connection with said plate-carrying adjusting means for visually recording the positional relation between said frames.

9. In a precision registering apparatus, means for adjustably supporting an index-marked negative, a frame supporting on its opposite faces in respective mutual parallelism a translucent index-marked plate and a sensitized plate, said frame being mounted for axial rotation for alternately opposing said plates to said negative, means for positionally and contactually adjusting said negative relative to both plates, and means in geared connection with said adjustable negative supporting means, for visually recording the positional relation of said negative to said plates.

10. In a centering device, means for adjustably supporting a negative, a hollow frame providing interior lighting means, designed to support upon its opposite faces, in respective mutual parallelism, a translucent plate and a sensitized plate, said frame being rotatable symmetrically for alternately opposing said plates to said negative, means for positionally and contactually adjusting said negative relative to said plates, and means in geared connection with said adjusting means, for visually recording upon graduated dials, the positional relation of said negative to said plates.

11. In a centering device, the combination with a diametric edge-marked negative, of means for the support and micrometric adjustment of said negative universally in one plane, a centrally pivoted double faced frame, said faces respectively providing clamping support for ground-glass, having right angularly related diametric cross-lines thereon, and for a photographically sensitized plate, means for rotating said frame for alternately opposing said ground-glass and said sensitized plate to said negative, and means for the recording of the positional relations of said negative with said glass and plate, said recording means being in fixed geared connection with said micrometric adjustable negative supporting means.

12. In a precision registering device, a negative holding and adjusting means, having an index-marked negative attached thereto, a frame, supporting in mutually parallel relation, upon opposite sides thereof, respectively a translucent plate provided with cross-lines, and a sensitized plate, said frame being rotatable to bring the respective plates in opposition with said negative, and means for adjusting said negative-indexes for registration with said cross-lines, and for causing contact between said negative and either of said plates, said adjusting means, being in geared connection with registering dials, for visually recording the positional relation of said negative, to said plates.

13. In an apparatus of the character described, a photonegative plate holding frame for adjustably mounting and positioning a negative plate, a pivoted frame providing a platen for mounting a sensitized photoprinting sheet, and a translucent gauge plate for centering and gauging the negative carried by said first named frame, mounted upon said second frame in spaced parallelism with said platen, and therewith providing an illuminating chamber therebetween, said second frame being rotatable for alternately bringing said platen and translucent plate into parallel cooperative position with said negative plate.

14. In an apparatus of the character described, a photonegative plate holding frame for adjustably mounting and positioning a negative plate, a pivoted frame providing a platen for mounting a sensitized photoprinting sheet and a translucent gauge plate for centering and gauging the negative carried by said first named frame mounted upon said second frame in spaced parallelism with said platen and therewith providing an illuminating chamber therebetween, said second frame being rotatable for alternately bringing said platen and translucent plate into parallel cooperative position with said negative plate, and means for locking said second frame in its adjusted positions.

15. In an apparatus of the character described, a photonegative plate holding frame for adjustably mounting or positioning a photoplate, and a hollow second frame providing a platen side and a translucent gauge-marked opposite side in parallelism with said platen side and interiorly an illumination chamber, said second frame adjustable to alternately bring said sides into respective parallelism with the negative plate carried by said plate holding frame.

16. In an apparatus of the character described, a photonegative plate holding frame for adjustably mounting or positioning a photoplate, and a hollow second frame providing a platen side and a translucent gauge-marked opposite side in parallelism with said platen side and interiorly an illumination chamber, said second frame adjustable to alternately bring said sides into respective parallelism with the negative plate carried by said plate holding frame, and means for locking said second frame in its adjusted positions.

17. In an apparatus of the character described, a photonegative plate holding frame for adjustably mounting and positioning a photoplate, means for micrometrically adjusting said frame about an axis, means for micrometrically adjusting said frame in right angular plate positioning directions, and a hollow second frame providing a plane platen side and a translucent gauge-marked opposite side in parallelism with said platen side, and interiorly an illumination chamber, said second frame adjustable to alternately bring said sides into cooperative parallelism with the photoplate carried by said plate holding frame.

18. In an apparatus of the character described, a photonegative plate holding frame for adjustably mounting and positioning a photoplate, means for micrometrically adjusting said frame about an axis, means for micrometrically adjusting said frame in right angular plate positioning directions, and a hollow second frame providing a plane platen side and a translucent gauge-marked opposite side in parallelism with said platen side and interiorly an illumination chamber, said second frame adjustable to alternately bring said sides into cooperative parallelism with the photoplate carried by said plate holding frame, means for locking said second frame in its adjusted position, and means for translating said photoplate holding frame toward and from said sides of said second frame.

19. In an apparatus of the character described, a photonegative plate holding frame for adjustably mounting and positioning a photoplate, means for micometrically adjusting said frame about an axis, means for micrometrically adjusting said frame in right angular plate positioning directions, and a hollow second frame providing a plane platen side and a translucent gauge-marked opposite side in parallelism with said platen side and interiorly an illumination chamber, said second frame adjustable to alternately bring said sides into cooperative parallelism with the photoplate carried by said plate holding frame, said plate holding frame translatable toward and from said second frame for contacting the photoplate against a sensitized sheet mounted upon the platen side of said second frame.

20. In an apparatus of the character described, a photonegative plate holding frame for adjustably mounting and positioning a photoplate, means for micrometrically adjusting said frame about an axis, means for micrometrically adjusting said frame in right angular plate positioning directions, and a hollow second frame providing a plane platen side and a translucent gauge-marked opposite side in parallelism with said platen side, and interiorly an illumination chamber, said second frame adjustable to alternately bring said sides into cooperative parallelism with the photoplate carried by said plate holding frame, said plate holding frame translatable toward and from said second frame for contacting the photoplate against a sensitized sheet mounted upon the platen side of said second frame, and means for translating said photoplate holding frame and for contacting said photoplate against said platen under a determined degree of pressure.

In witness whereof, I hereunto subscribe my name, as attested by the two subscribing witnesses.

OSCAR FOURNIER.

Witnesses:
L. A. BECK,
R. KISTNER.